(12) United States Patent
Takakura et al.

(10) Patent No.: US 7,483,844 B2
(45) Date of Patent: Jan. 27, 2009

(54) COMPUTER SYSTEM FOR RETRIEVING A PRODUCT THAT MEETS CHARACTERISTICS OF A CUSTOMER

(75) Inventors: Keiji Takakura, Tokyo (JP); Michitada Kameoka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 715 days.

(21) Appl. No.: 10/342,320

(22) Filed: Jan. 15, 2003

(65) Prior Publication Data

US 2003/0158793 A1    Aug. 21, 2003

(30) Foreign Application Priority Data

Feb. 20, 2002   (JP) ............................. 2002-042862

(51) Int. Cl.
  *G06Q 30/00* (2006.01)
(52) U.S. Cl. ............................. 705/26; 705/26; 705/37
(58) Field of Classification Search .................. 705/26, 705/37

See application file for complete search history.

(56) References Cited

U.S. PATENT DOCUMENTS 6,119,101 A * 9/2000 Peckover ..................... 705/26

FOREIGN PATENT DOCUMENTS

| | | |
|---|---|---|
| JP | 11-007467 | 1/1999 |
| JP | 2001-43281 | 2/2001 |
| JP | 2001-043281 A1 | 2/2001 |
| JP | 2002-024625 A1 | 1/2002 |
| JP | 2002-032401 | 1/2002 |

OTHER PUBLICATIONS

Feature: servers, Computing Canada. Willowdale: May 25, 1994. vol. 20, Iss. 11; p. 39, 12 pages, downloaded from ProQuest on the Internet on Sep. 8, 2008. 12 pages.*

* cited by examiner

*Primary Examiner*—James Zurita
(74) *Attorney, Agent, or Firm*—Arent Fox LLP

(57) ABSTRACT

A computer system for retrieving a product that meets characteristics of a customer. The system comprises a main agent and a supplier agent connected to the main agent through a network. The main agent comprises a customer table for storing customer characteristic codes. Each of the customer characteristic codes represents characteristics of each of customer. The supplier agent comprises a product database for storing products provided by the supplier. Each of the products is assigned a customer characteristic code in accordance with characteristics of the product. The main agent writes the product search request received from a customer and the customer characteristic code of the customer in a parameter table. The supplier agent reads the parameter table and retrieves a product that meets the product search request and that is assigned the customer characteristic code. The main agent edits the search result into a search result screen.

10 Claims, 12 Drawing Sheets

| Name | Product No. | Price | Labor Cost | Total | Delivery Time | Appearance | Functionality | Performance | Interior | Cluster |
|---|---|---|---|---|---|---|---|---|---|---|
| Rear Spoiler | ABS-325 | 36000 | 4500 | 42525 | 3W | 4 | 1 | 1 | 0 | C1, C4 |
| Aluminum Wheel | | | | | 2W | 1 | 2 | 2 | 0 | C2 |
| . | | | | | | | | | | |
| . | | | | | | | | | | |
| . | | | | | | | | | | |

Figure 3

| Name | |
|---|---|
| Sex | ○ Male ○ Female |
| Age | [ ] Years Old |
| Marriage/Family | ○ Not married ○ Married (with children) ○ Married (no children) |

| | Strongly Agree | Agree | Disagree | Strongly Disagree |
|---|---|---|---|---|
| 1. It is important that vehicles are conveniently used | ○ | ○ | ○ | ○ |
| 2. I read vehicle magazine(s) | ○ | ○ | ○ | ○ |
| ---------------------- | ○ | ○ | ○ | ○ |
| ⋮ | | | | |
| ---------------------- | ○ | ○ | ○ | ○ |

Figure 6

Form for Vehicle-Related Product Search

I want to make [Appearance / Functionality / Performance / Interior] of my car [Sophisticated / Beautiful / conspicuous / Conservative / Comfortable]

Budget is about [less than $100 / $100-$200 / $200-$500 / $500-$700 / $700-$900 / $900-$1100]  Delivery time is about [One week / Two weeks / Three Weeks / Four Weeks]

[Send]

Figure 7

| Request ID | Customer ID | Customer Name | Customer Characteristics | Appearance | Functionality | Performance | Interior | Budget | Delivery Time |
|---|---|---|---|---|---|---|---|---|---|
| A01001 | 01001 | XXXXXX | C1 | 1 | N | N | N | 5 | 3 |

Figure 8

| Name | Product No. | Price | Labor Cost | Total | Delivery Time | Appearance | Functionality | Performance | Interior | Cluster |
|---|---|---|---|---|---|---|---|---|---|---|
| Rear Spoiler | ABS-325 | 36000 | 4500 | 42525 | 3W | 4 | 1 | 1 | 0 | C1, C4 |
| Aluminum Wheel | | | | | 2W | 1 | 2 | 2 | 0 | C2 |
| . | | | | | | | | | | |
| . | | | | | | | | | | |

Figure 9

| Request ID | Customer ID | Supplier ID | Supplier Name |
|---|---|---|---|
| A01001 | 01001 | B01001 | Company "A" |

| Name | Product No. | Price | Labor Cost | Total | Attachment | Writing Completion Flag |
|---|---|---|---|---|---|---|
| Rear Spoiler | ABS-325 | 36000 | 4500 | 42525 | zzz.html, yyy.jpg | 1 |

Result Field

COMPUTER SYSTEM FOR RETRIEVING A PRODUCT THAT MEETS CHARACTERISTICS OF A CUSTOMER

TECHNICAL FILED

The present invention relates to a computer system for retrieving a product that meets characteristics of a customer.

BACKGROUND OF THE INVENTION

When a customer purchases a product using an on-line service, the customer usually enters on a screen of a personal computer a product name, a price, a store name and so on. Products retrieved in accordance with the entered conditions are displayed on the screen. Such a retrieving method may present an enormous number of products to the customer, which may make it difficult for the customer to select a desired product. In order to resolve such a difficulty, several methods are proposed for selecting and presenting products that a customer desires.

The Japanese Patent Application Unexamined Publication No. 2001-43281 discloses a method for providing highly-reliable information about a product to a customer who wants to purchase the product. An agent server records in a database request information from a member's terminal. The request information includes data (product name, price etc.) about a product which the member wants to purchase. The agent server searches the database for the request information in response to a request from a terminal located at a store. The result of the search is transmitted to the terminal of the store. Depending on the search result, information (inventory, price etc.) for offering one or more products is entered from the store terminal. The entered offering information is transmitted to the member's terminal.

However, according to the above method, the pre-registered store needs to retrieve the request information. Analysis of the retrieved request information for responding to a customer needs to be performed by human being. When the number of requests increases, the process at the store may incur some delay, which may cause a delay in replying to the customer. The method also includes a process for determining a store in which the request information is processed in accordance with a category included in the request information. The method fails to propose a product in view of the preferences and tendency of a customer.

Conventionally, sales of a product is performed by sales staff. The sales staff can propose a product according to the characteristics of a customer in view of the preferences and tendency of the customer by talking with the customer. However, the sales of a product performed by such sales staff takes a cost. Whether a proposed product meets the desire of a customer depends on the knowledge of sales staff. In the case of a product having various components such as a vehicle, it is difficult for a single sales person to get knowledge about all of the vehicle-related products because there are many suppliers for supplying such vehicle-related products.

When a customer already knows the name or type of a product, it is not so difficult for the customer to retrieve the desired product by himself or herself. However, it is difficult for a customer to know what kind of products that meet his or her own personality are available in the market. For example, it is especially difficult for a person having no expert knowledge about a vehicle to determine what equipment should be installed in order to satisfy a desire such as "I want my own car to be a car with which I can express my own personality." It is also difficult for such a person to know what equipment should be installed in order to satisfy an abstract desire such as "I want to make the appearance of my own car beautiful."

Therefore, there exists a need for a computer system that can retrieve a product in accordance with the characteristics of a customer and present it to the customer. There exists another need for a computer system that can retrieve a product that meets an abstract desire of a customer and present it to the customer.

SUMMARY OF THE INVENTION

The invention provides a computer system for retrieving one or more products that meet characteristics of a customer. The system comprises a main agent and a customer table provided in the main agent. The customer table stores customer characteristic codes. Each of the customer characteristic codes represents characteristics of each of customers. The system further comprises a supplier agent connected to the main agent through a network and a product database provided in the supplier agent. The product database stores products provided by a supplier of the supplier agent. Each of the products in the product database is assigned a customer characteristic code in accordance with characteristics of the product. The main agent identifies a customer based on a product search request received from the customer. A customer characteristic code for the identified customer is extracted from the customer table. The product search request and the extracted customer characteristic code are written in a parameter table. The supplier agent reads out the product search request and the customer characteristic code from the parameter table. The supplier agent extracts from the product databases one or more products that meet the product search request and that are assigned the customer characteristic code. The extracted products are written in a search result table. The main agent reads out the extracted products from the search result table to edit it into a search result screen.

According to the invention, one or more products that meet characteristics of a customer are automatically selected from products provided by one or more suppliers and then are presented to the customer. The customer can obtain a list of products that meet his or her own characteristics without specifying a supplier.

According to another aspect of the invention, each of the products in the product database is further assigned a product characteristic code that represents characteristics of the product. The main agent uses the product characteristic code to encode the product search request and writes the encoded product search request in the parameter table. The supplier agent extracts from the product database one or more products that have the product characteristic code included in the encoded product search request written in the parameter table and that are assigned the customer characteristic code of the identified customer.

According to the invention, by using the product characteristic code, one or more products that meet both of the product search request and the characteristics of the customer are automatically selected from products supplied by one or more suppliers. Furthermore, since the product search request is encoded by using the product characteristic code, diversification of product search requests is allowable.

According to another aspect of the invention, the customer characteristic code for a customer is determined based on an answer of the customer to a questionnaire. In one embodiment of the invention, the customer characteristic code has a first value representing the degree of interests that the customer has in vehicles and a second value representing the customer's sense of values for vehicles. Thus, characteristics of a customer regarding vehicles are represented by the numerical value. Conversion of the characteristics of a customer into the numerical value makes it easier to retrieve one or more products that meet the characteristics of the customer on a computer system.

According to another aspect of the invention, the product search request can be abstractly expressed without specifying a product name and a product type. The product search request is encoded by using the product characteristic code. Since the product search request can be abstractly expressed, it is possible to retrieve products based on customer's diversified requests. Since the search can be performed without limiting the name and type of products, various products that meet the characteristics of a customer are presented to the customer.

According to yet another aspect of the invention, there are a plurality of supplier agents. The main agent edits products extracted by the plurality of supplier agents into one search result screen. The search result screen may be designed to enable a customer to select and purchase a desired product from the extracted products. Thus, a customer can purchase a desired product from a list of products extracted in accordance with his or her own characteristics. When the customer selects and purchases the desired product, a display screen in which the customer can enter satisfaction for the product is provided to the customer.

BRIEF DESCRIPTION OF THE DRAWINGS

FIG. 3 is an example of a registration page in accordance with one embodiment of the present invention.

FIG. 6 is an example of a vehicle-related product search page in accordance with one embodiment of the present invention.

FIG. 7 is an example of a vehicle-related product database in accordance with one embodiment of the present invention.

FIG. 8 is an example of a parameter table in accordance with one embodiment of the present invention.

FIG. 9 is an example of a search result table in accordance with one embodiment of the present invention.

DESCRIPTION OF THE PREFERRED EMBODIMENTS

Figure 1:
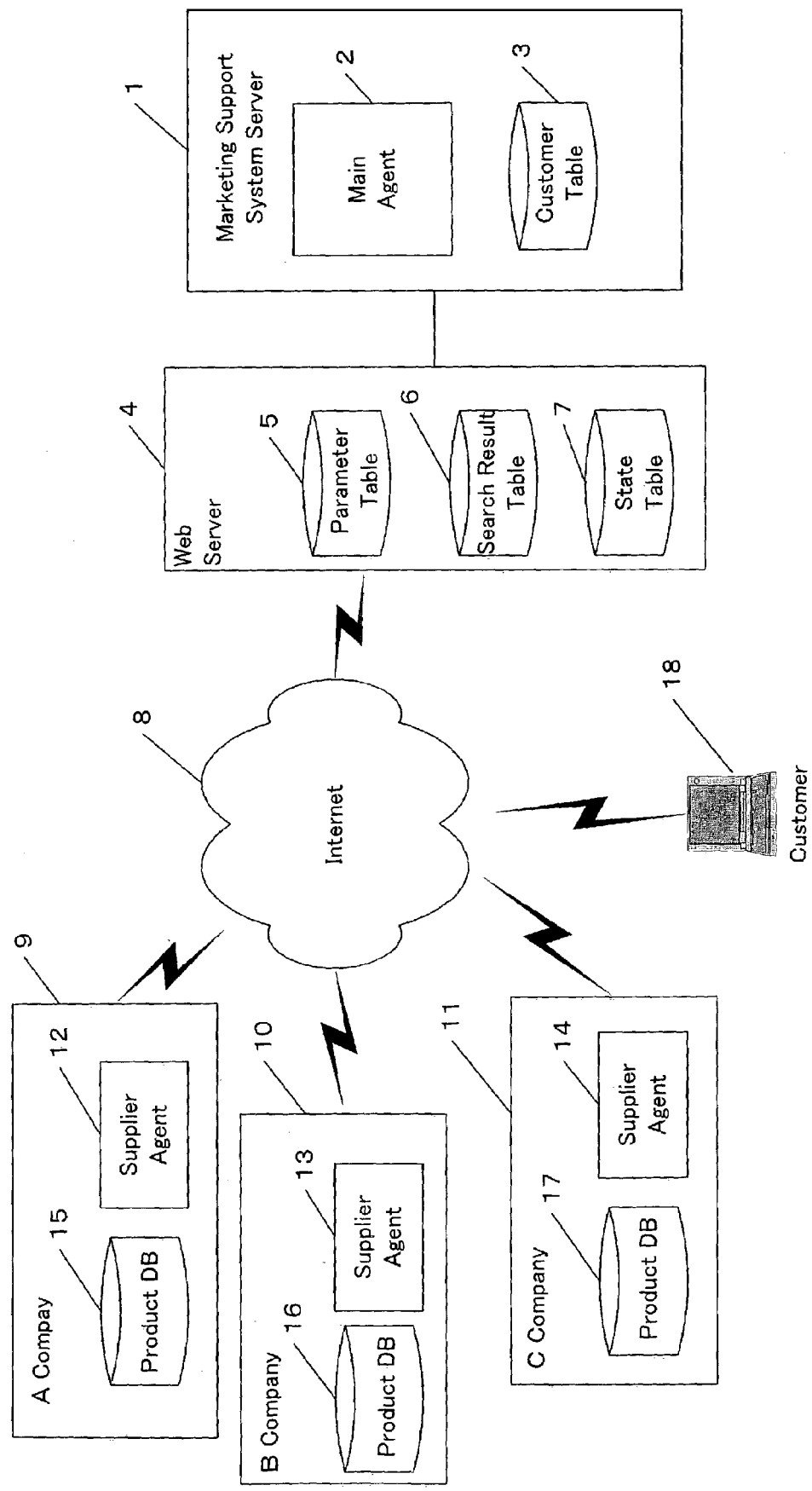
FIG. 1 is a general block diagram showing a system in accordance with one embodiment of the present invention.

Referring to the attached drawings, specific embodiments of the invention will be described. FIG. 1 is a general block diagram showing a system in accordance with one embodiment of the present invention. A marketing support computer system of a company X that manufactures and sells vehicles includes a server computer 1. The server 1 comprises a main agent 2 and a customer table 3. The main agent 2 is connected to the Internet 8 through a Web server 4. The customer table 3 includes, for each of customers, basic information including a name, ID, password and so on as well as a customer characteristic code.

There are a plurality of suppliers that supply vehicle-related products (vehicle parts) for vehicles manufactured and sold by the company X. For the sake of simplicity, suppliers A through C are shown in FIG. 1. Supplier computer systems 9 through 11 installed in the respective suppliers are connected to the Internet 8. The supplier computer systems 9 through 11 comprise supplier agents 12 through 14 and vehicle-related product databases 15 through 17, respectively. The supplier agents 12 through 14 are connected to the main agent 2 via the Internet 8.

A customer terminal 18, which can be a personal computer, is also connected to the Internet 8. The customer terminal 18 can access website of the company X maintained in the Web server 4. The website of the company X includes a product search page through which a customer may request a search for a vehicle-related product that the customer desires. The customer can transmit a vehicle-related product search request to the main agent on the website of the company X.

The Web server 4 comprises a parameter table 5, a search result table 6 and a state table 7. The parameter table 5 is used to deliver the product search request from the main agent 2 to the supplier agents 12-14. The search result table 6 is used to deliver, from the supplier agents 12-14 to the main agent 2, a result of the search performed upon the vehicle-related product databases 15 through 17 based on the product search request. The state table 7 stores the progress of the product search request.

Figure 2:
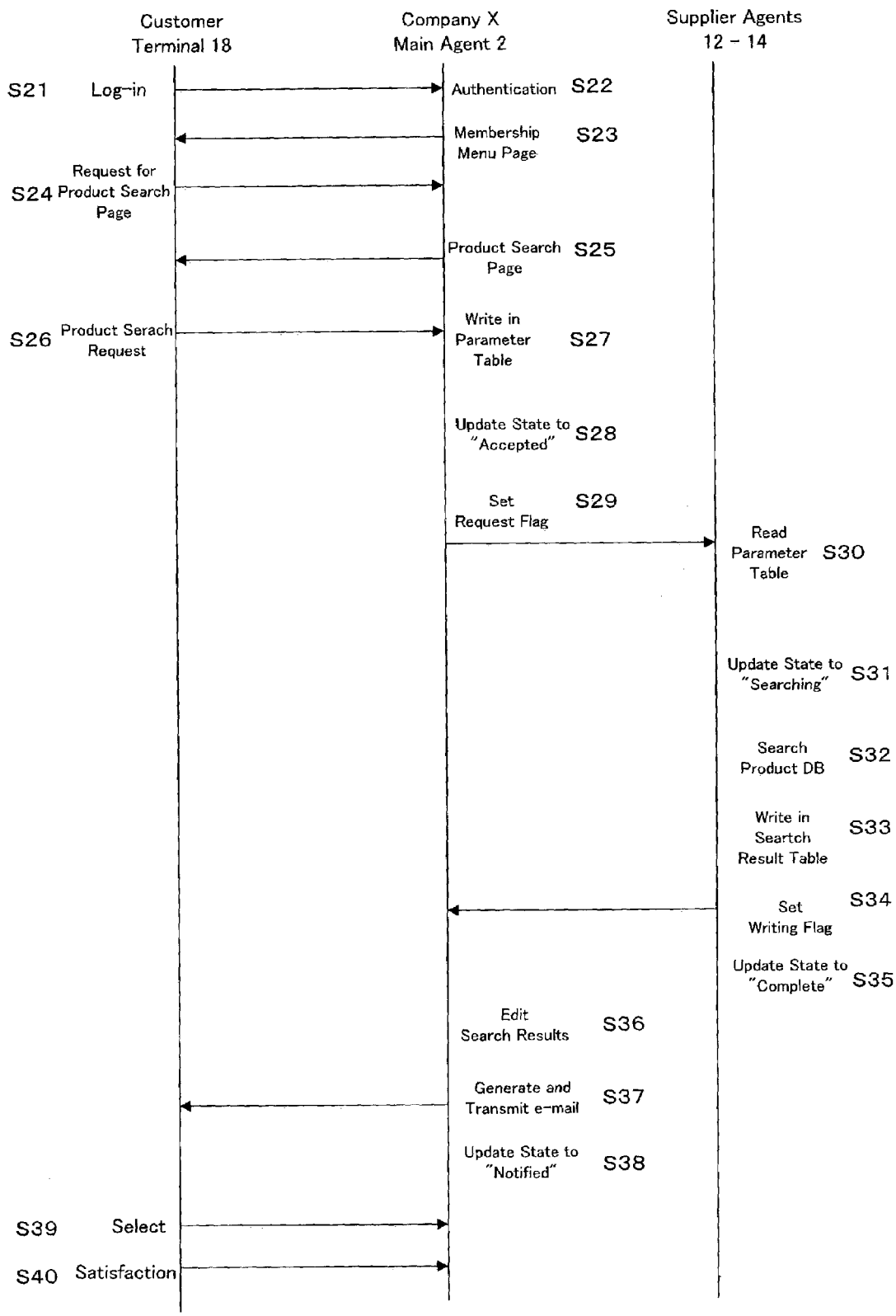
FIG. 2 is a schematic diagram showing an operation flow performed by a customer terminal, a main agent and a supplier agent in accordance with one embodiment of the present invention.

FIG. 2 is a schematic flow diagram showing operation for retrieving and presenting one or more vehicle-related products that meet characteristics of a customer in accordance with one embodiment of the present invention.

A customer enters and transmits his or her ID and password in a log-in screen provided on the website of the company X (S21). The main agent 2 receives and authenticates the ID and the password (S22). When the authentication of the ID and the password is successful, the main agent 2 transmits a membership menu page to the customer (S23). The customer selects a vehicle-related product search page from the menu page and transmits it (S24). The main agent 2 transmits the product search page to the customer terminal 18 (S25). The customer enters a request for a vehicle-related product that the customer desires on the product search page. In the embodiment, the product search request is abstractly expressed. The name and type of the vehicle-related product are not specified. The customer clicks on a sending button to transmit the product search request (S26).

The main agent 2 receives the search request and assigns a unique request ID to the product search request. The main agent 2 identifies a customer based on the search request and extracts from the customer table 3 a customer characteristic code associated with the identified customer. The main agent 2 writes the product search request and the customer characteristic code in the parameter table 5 (S27). The main agent 2 updates the state table 7 to indicate "Accepted" (S28). A request flag held in the Web server 4 is set to 1 (S29).

The supplier agents 12 through 14 periodically check the value of the request flag. When the value of the request flag is set to 1, the supplier agents 12 through 14 access the Web server 4 to read the parameter table 5 (S30). The supplier agents 12 through 14 update the state table 7 to indicate "Searching" (S31). The supplier agents 12 through 14 extract from their own vehicle-related product databases 15 through 17 one or more vehicle-related products that meet the customer's product search request and the customer characteristic code (S32).

The supplier agents 12 through 14 write data regarding the extracted vehicle-related products in the search result table 6 (S33). Furthermore, the supplier agents 12 through 14 set a writing flag provided in the search result table to 1 (S34) and update the state table 7 to indicate "Complete" (S35).

Alternatively, the supplier agents 12 through 14 may acquire information about the customer who has requested a search for the vehicle-related product from their own customer information. For example, the supplier agents 12 through 14 may write some descriptions in the search result table so as to provide a customer with some additional services, such as discounting based on the purchase history of the customer.

The main agent 2 periodically checks the value of the writing flag. When the value of the writing flag is set to 1, the main agent 2 reads the search result table 6. The main agent 2 generates a search result page from the obtained search results (S36). The search results generated by the supplier agents 12 through 14 are edited into one search result page.

In order to notify the customer of the search results, the main agent 2 generates e-mail in which URL for the search result page is described. The e-mail is transmitted to the customer terminal 18 (S37). The main agent 2 updates the state table 7 to indicate "Notified" (S38).

The customer can access the search result page from the URL described in the received e-mail. The customer can select a desired vehicle-related product to purchase it from vehicle-related products displayed in the search result page (S39). A purchase process for the selected vehicle-related product is performed by the main agent 2. The customer is requested to enter customer satisfaction when the customer purchases the vehicle-related product (S40). The entered customer satisfaction is delivered to the main agent 2. Such customer satisfaction can be referred to in subsequent marketing activities.

Alternatively, the parameter table 5 may be generated by the main agent 2 when the main agent 2 receives the product search request. The generated parameter table is downloaded to the Web server 4. Similarly, the search result table 6 may be generated by each of the supplier agents 12 through 14 when the supplier agent has completed the search. The generated search result table is uploaded to the Web server 4.

In another embodiment, the parameter table may be distributed in a form of file or e-mail from the main agent to each of the supplier agents. The search result may be also transmitted in a form of file or e-mail from each of the supplier agents to the main agent.

The state table 7 can be referred to by the main agent 2, the supplier agents 12 through 14 and the customer terminal 18. Thus, the company X, suppliers and customer can know in real time the progress of the product search request.

The customer characteristic code for a customer comprises a first value representing the degree of interests that the customer has in vehicles and a second value representing a sense of values that the customer has for vehicles. The customer characteristic code for each of customers is pre-calculated and stored in the customer characteristic table 3. A method for determining the customer characteristic code will be described referring to FIGS. 3 and 4.

FIG. 3 is an example of a registration page 41 displayed on the customer terminal 18 by the main agent 2 when a customer makes a new registration to the company X. The registration page 41 includes a basic information field 42 for sex, age etc. and a questionnaire field 43.

Questions in the questionnaire field 43 are established based on analysis of the past results of questionnaires, purchase records of customers and characteristics of customers, so that the customer's interests and the customer's sense of values regarding vehicles can be measured. More specifically, the questions in the questionnaire field 43 are constructed so that factors representing the customer's interests and the customer's sense of values regarding vehicles can be extracted in a factor analysis, which will be described later.

Answers of "strongly agree", "agree", "disagree" and "strongly disagree" are prepared for each question. A predetermined value is given to each answer for each question. For example, the answer of "strongly agree" to the first question is given four points and the answer of "strongly disagree" to the first question is given one point.

A customer enters data in the basic information field 42 and selects one answer for each question in the questionnaire field 43. The data entered by the customer is sent to the main agent 2.

Figure 4:
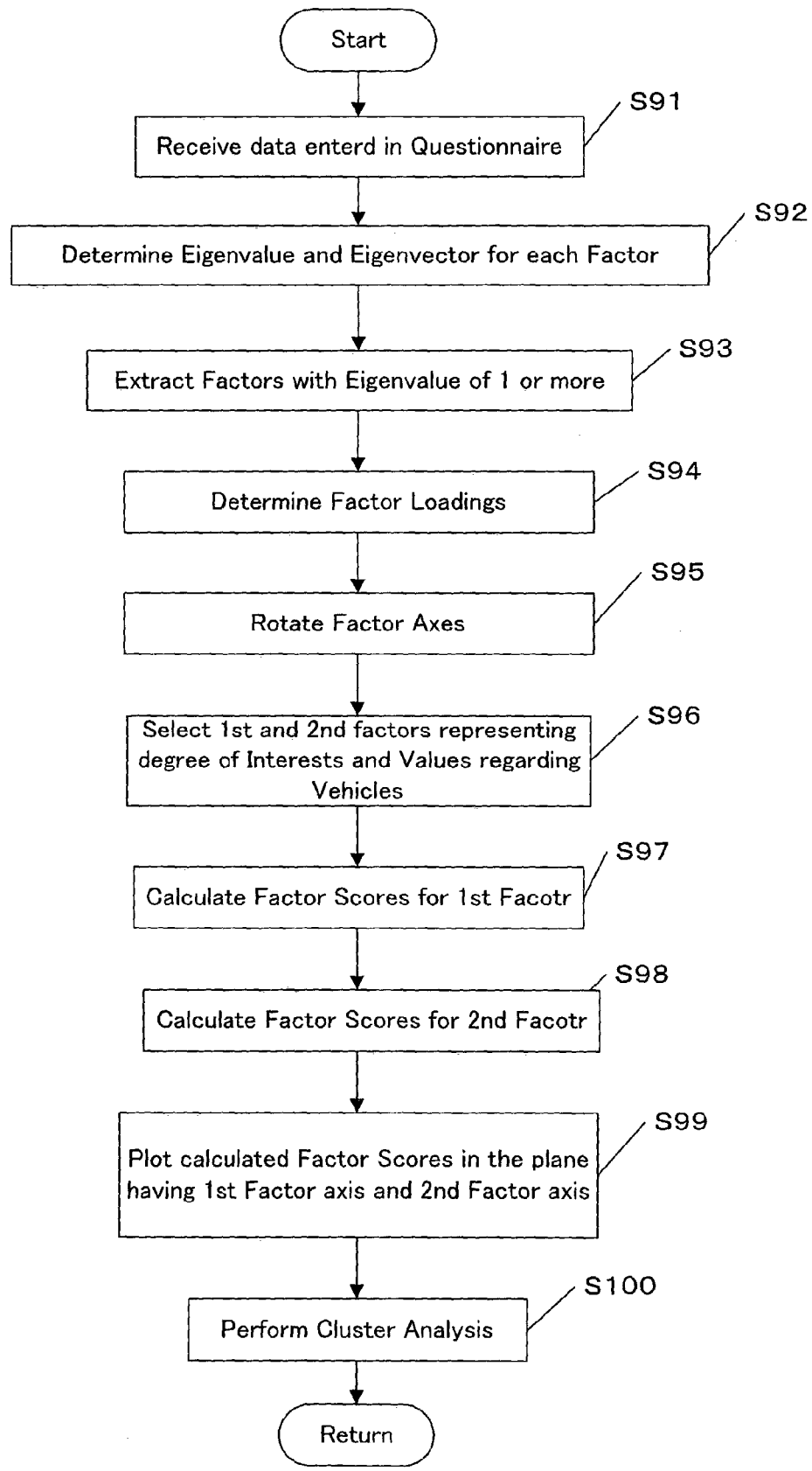
FIG. 4 is a flowchart of a process for determining a customer characteristic code and a cluster in accordance with one embodiment of the present invention.

FIG. 4 is a flowchart of a method for determining the customer characteristic code and a cluster. The determination is performed in accordance with a factor analysis and a cluster analysis. Since the factor analysis and the cluster analysis are statistical analysis methods well known to those skilled in the art, details will not be described herein. The process illustrated in FIG. 4 is typically implemented by a computer program.

In step S91, data entered in the questionnaire shown in FIG. 3 is received from customers. The data answered by each of the customers will be hereinafter referred to as a sample. According to the example described with reference to FIG. 3, when the answer of a customer to the first question is "strongly agree", a sample value of the customer for the first question is "4."

In steps S91 through S99, the factor analysis is carried out upon the collected samples. At first, a principal component analysis using a correlation matrix is applied to the samples to calculate an eigenvalue and an eigenvector for each of the factors (S92). In step S93, factors with an eigenvalue of 1 or more are extracted.

In step S94, factor loadings are determined for each of the factors. Each of the factor loadings is a correlation coefficient between a factor and each of questions (explanatory variables). In step S95, the factor axes are rotated. Factor loadings after the rotation are determined. The rotation of the factor axes makes it easier to interpret the factors. The rotation may be performed using any rotation scheme such as varimax rotation known to those skilled in the art.

In step S96, by examining the factor loadings determined in step S95, a factor interpreted as representing the degree of interests in vehicles (the first factor) and a factor interpreted as representing a sense of values for vehicles (the second factor) are selected.

In step S97, as for the first factor, a factor score of each of the samples is determined. For example, a factor score $z_1$ of the first factor for a given sample "s" is determined according to the following equation (1). In the equation (1), "n" indicates the number of questions (explanatory variables), $x_1$, $x_2$, . . . indicate the sample values (answers) to the 1st, 2nd, . . . questions, respectively. $a_{11}$, $a_{12}$, . . . indicate the eigenvector for the first factor determined in step S92.

$$z_1 = a_{11} \times x_1 + a_{12} \times x_2 +, \ldots a_{1n} \times x_n \qquad (1)$$

In step S98, as for the second factor, a factor score of each of the samples is determined. For example, a factor score $z_2$ of the second factor for a given sample "s" is determined according to the following equation (2). In the equation (2), $a_{21}$, $a_{22}$, . . . indicate the eigenvector for the second factor determined in step S92.

$$z_2 = a_{21} \times x_1 + a_{22} \times x_2 +. \ldots a_{2n} \times x_n \qquad (2)$$

Thus, for each of the customers, the first factor score $z_1$ and the second factor score $z_2$ are determined. The first factor score is used as the first value of the customer characteristic code. The second factor score is used as the second value of the customer characteristic code. The determined first and second factor scores are stored as the customer characteristic code in the customer table 3.

In step S99, each of the samples is plotted in a plane with the first factor score on the horizontal axis and the second factor score on the vertical axis. In step S100, a cluster analysis is carried out for the samples plotted on the plane. The cluster analysis allows samples having high similarity, that is, samples that are at smaller distances from one another, to be clustered into a single cluster. Euclidean distance may be used as a distance function. Next, a known method such as a nearest neighbor method, a centroid method or Ward's method is used to group smaller clusters that are at smaller distances from one another into a single larger cluster.

It is preferable to divide customers into male and female and then perform the factor analysis and the cluster analysis upon each of the male samples and the female samples. This is because there is a big difference between male and female in preferences, tendency and so on.

Figure 5:
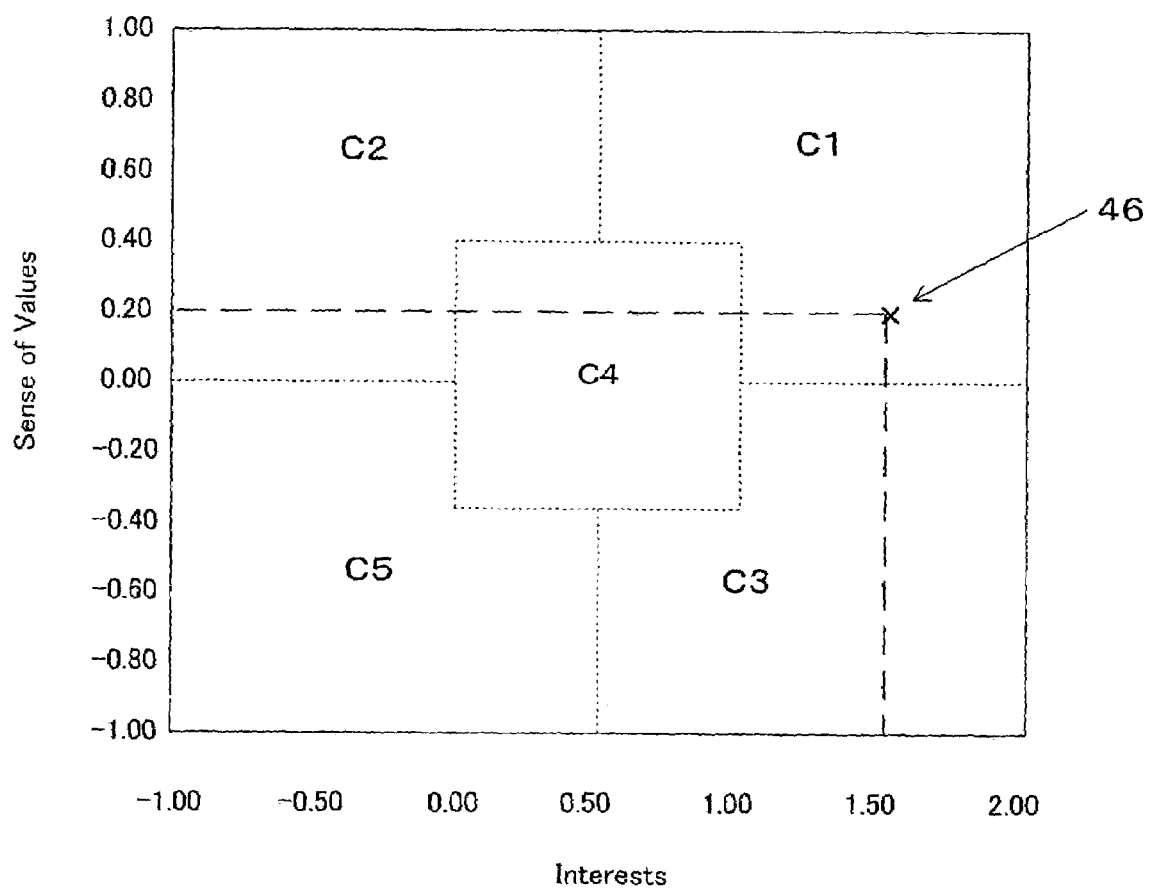
FIG. 5 is an example of a customer characteristic map in accordance with one embodiment of the present invention.

FIG. 5 is an example of a customer characteristic map showing the clusters formed in step S100 of FIG. 4. The map is stored in a memory (or an external storage) of the main agent 2. As described above, the horizontal axis of the map indicates the degree of interests (the first factor score) regarding vehicles and the vertical axis indicates a sense of values (the second factor score) regarding vehicles. As the value of "interests" of the characteristic code for a customer is greater, the customer has higher interests in vehicles. As the value of "sense of values" is greater, the customer has a higher sense of values for vehicles.

In the present embodiment, five clusters are formed. A cluster C1 indicates a class of customers having a higher degree of interests and a higher sense of values. Customers in this class have a higher intention to customize their own vehicles for the roadability, equipment and so on. For example, a customer who tunes a suspension and an engine by himself or herself is included in the cluster C1.

A cluster C2 indicates a class of customers having a lower degree of interests and a higher sense of values. Customers in this class allow customization that has no influence on the roadability. For example, a customer who doesn't have expert knowledge about a vehicle but thinks that it is important to express himself or herself through the vehicle is included in the cluster C2.

A cluster C3 indicates a class of customers having a higher degree of interests and a lower sense of values. Customers in this class allow slight customization (for example, customization for a vehicle-related product such as a roof carrier or rear camera). For example, a customer who has expert knowledge about a vehicle, but whose selection of a vehicle is easily influenced by fashion, social common sense and so on is included in the cluster C3.

A cluster C5 indicates a class of customers having a lower degree of interests and a lower sense of values. Customers included in this class have little intention to customize their own vehicles. For example, a customer who regards a vehicle as a practical tool is included in the cluster C5.

A cluster C4 indicates a class of customers having an average degree of interests and an average sense of values.

A point 46 shown in FIG. 5 is an example of the customer characteristic code. The customer characteristic code is expressed by (1.50, 0.20) and belongs to the cluster C1.

FIG. 6 is an example showing a vehicle-related product search page 50. The product search page 50 includes an object field 51, a description field 52, a budget field 53 and a delivery time field 54. The object field 51 is a field in which a customer specifies which portion of a vehicle is to be customized. The description field 52 is a field for specifying how the portion specified in the object field 51 is to be customized. The budget field 53 is a field for specifying a budget for the customization. The delivery time field 54 is a field for specifying a desired delivery time of one or more vehicle-related products necessary for the customization.

Through theses fields, for example, if "I want to make "appearance" of my car "beautiful" with the budget of "$100 to $200" and the delivery time of "two weeks"" is specified, one or more vehicle-related products that meet the conditions are retrieved. By using the object field 51 in combination with the description field 52, it is possible to abstractly express the search request. For example, when "functionality" is specified in the object field 51 and "high" is specified in the description field 52, one or more vehicle-related products having higher functionality are searched. When "interior" is specified in the object field 51 and "comfortable" is specified in the description field 52, one or more vehicle-related products used to make the interior comfortable are searched.

In the system in accordance with the present invention, a customer does not specify a product name and a product type in the product search page 50. The abstract expression of the product search request allows one or more products that meet various preferences of a customer to be retrieved without limiting suppliers. The abstract expression of the search request allows a customer to know what vehicle-related products are provided by suppliers.

When a customer clicks on the sending button 55, the search request specified in the product search page 50 is transmitted to the main agent 2.

The vehicle-related product search page shown in FIG. 6 is an example. Another expression may be used for representing a customer's request. For example, instead of items contained in the object field 51 or as a sub-menu of the items, a product type such as a tire, bumper, lamp or the like may be provided. Another field for specifying a product name may be provided.

Other fields for specifying specific or abstract items including color, brightness, roadability and the like may be provided. Moreover, the object field and the description field may be configured to select a plurality of items.

In another embodiment, characteristics of a product may be described in natural language. In this case, the main agent 2 may be provided with a program for analyzing and recognizing the described characteristics of the product.

FIG. 7 is an example of the parameter table in which the vehicle-related product search request from a customer is written by the main agent 2. The main agent 2 writes a request ID, customer ID and customer name in the parameter table 5. The main agent 2 extracts the customer characteristic code from the customer table 3 based on the customer ID. The main agent 2 refers to the customer characteristic map (FIG. 5) to determine a cluster to which the customer characteristic code belongs. The determined cluster is written in the customer characteristic field of the parameter table 5.

The main agent 2 uses a product characteristic code to encode the data entered in the object, description, budget and delivery time fields 51 through 54 of the product search page 50. The product characteristic code is predetermined for each of items included in the object field 51 and the description field 52. For example, value 1 to value 5 are prepared for the product characteristic code of "appearance." Value 1 shows "sophisticated." Value 2 shows "beautiful." Value 3 shows "conspicuous." Value 4 shows "conservative." Value 5 shows "comfortable." Value 1 to Value 3 are prepared for the product characteristic code of "functionality." Value 1 shows "high." Value 2 shows "medium." Value 3 shows "low."

The main agent 2 writes the encoded product search request in the parameter table 5. In the present example, the product characteristic code of "appearance" is 1, which indicates a request for making the "appearance" of the vehicle more "sophisticated." The product characteristic code of the budget is 5, which indicates a request that the budget be $700 to $900. The product characteristic code of the delivery time is 3, which indicates a request that the delivery time be three weeks. In the present embodiment, only one item is selected in the object field 51. Therefore, "N" is written in the functionality, performance and interior fields of the parameter table 5.

Encoding of the vehicle-related product search request by using the product characteristic code allows each of various vehicle-related product search requests to be transformed into a form appropriate to computer processing.

FIG. 8 is an example of data in the vehicle-related product database provided in the supplier agent. The vehicle-related product database includes one record for each of vehicle-related products. Each record includes basic information including a product number, price, labor cost, total, and delivery time.

Each record further includes fields for items included in the object field 51 of FIG. 6. In other words, each record includes the appearance, functionality, performance and interior fields. Each of these fields stores the product characteristic code that represents characteristics of the product. The product characteristic code follows the encoding scheme described with reference to FIG. 6.

For example, if the appearance of a rear spoiler provided by a given supplier is "conservative," the appearance field of the rear spoiler is assigned a value of 4. If the rear spoiler has higher functionality, the functionality field of the rear spoiler is assigned a value of 1. If the rear spoiler has higher performance, the performance field of the rear spoiler is assigned a value of 1. Because the rear spoiler is mounted on the outside of the vehicle body, the "interior" field is not assigned any product characteristic code, but is assigned zero. Thus, characteristics of the rear spoiler is expressed by "4110."

Furthermore, each record includes a cluster field. The cluster field stores a cluster assigned depending on the characteristics of the vehicle-related product. As described above, five clusters C1 through C5 are provided in the present embodiment. Therefore, each vehicle-related product is assigned one or more of the clusters C1 through C5.

It is predetermined, based on the functionality, price, etc. of the vehicle-related product, which cluster is assigned to which vehicle-related product. Thus, since each vehicle-related product is associated with one or more clusters (that is, customer characteristic codes in a predetermined range), it becomes easy to retrieve a vehicle-related product in accordance with the characteristics of a customer.

FIG. 9 is an example of the search result table 6 written by the supplier agent. The supplier agent writes a request ID, a customer ID, own ID and own name in the search result table 6. The search result table 6 includes a result field. The supplier agent writes, in the search result field, a name, product number, price, labor cost and total of the vehicle-related product extracted from its own vehicle-related product database.

The search result field further includes an attachment field. The attachment field may include filenames of one or more files having text that describes the extracted vehicle-related product and image data of the vehicle-related product. The attachment file is uploaded to the Web server 4 when the search result table 6 is written. When the supplier agent completes the writing operation into the search result table 6, the agent sets a value of 1 in the writing completion flag field.

If the supplier agent retrieves a plurality of vehicle-related products, the agent may write information about the plurality of vehicle-related products into the search result table 6. For example, a plurality of records may be provided in the search result table 6 so that information about each of the plurality of vehicle-related products is written into each record.

Search results from a plurality of supplier agents are written in one search result table. Alternatively, one search result table may be provided in each supplier agent.

Figure 10:
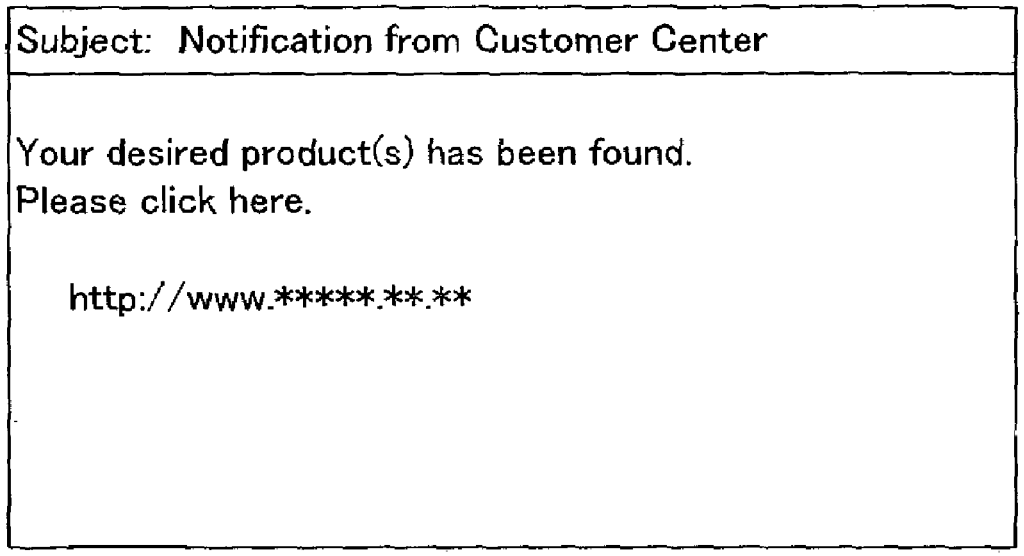
FIG. 10 is an example of e-mail for notifying a customer of a search result in accordance with one embodiment of the present invention.

FIG. 10 is an example of e-mail, transmitted from the main agent 2 to the customer terminal 18, for notifying a customer of the search result. The main agent 2 edits the search result extracted from the search result table 6 into a page. A plurality of search results extracted from a plurality of supplier agents are edited into one page. The main agent 2 describes URL of the search result page in the e-mail and transmits it to the customer. The customer can refer to the search result by using the URL described in the e-mail.

Figure 11:
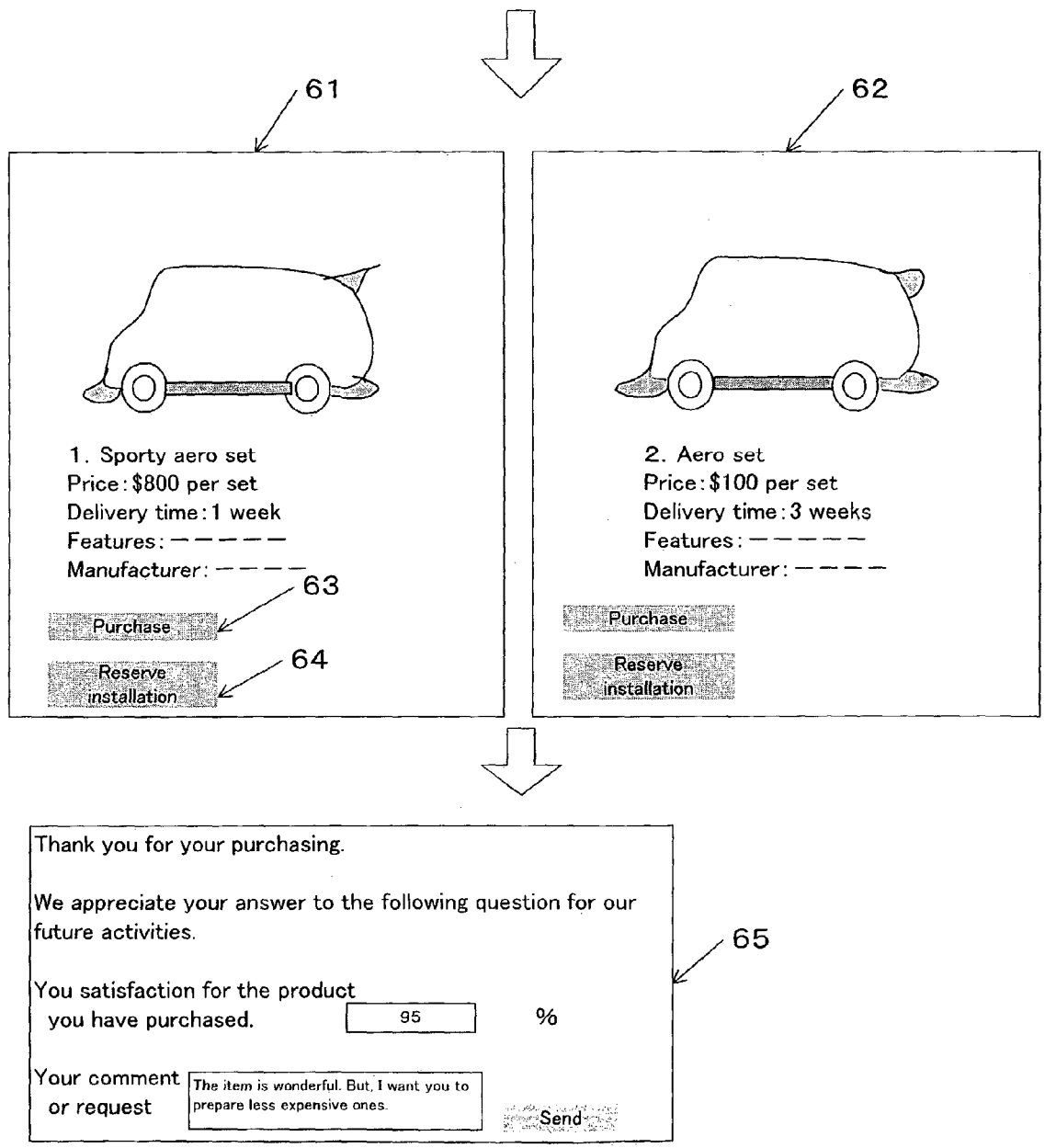
FIG. 11 is an example of a search result page in accordance with one embodiment of the present invention.

FIG. 11 is an example of the search result page 60 displayed by selecting the URL described in the e-mail. The search result page 60 displays a list of vehicle-related products that meet the product search request from a customer and the customer characteristic code of the customer. The customer can select a desired product on the list.

A reference number 61 shows an example of the page displayed when the first vehicle-related product is selected on the page 60. A reference number 62 shows an example of the page displayed when the second vehicle-related product is selected on the page 60. Each of the pages displays a photograph of the vehicle-related product as well as detailed information about the vehicle-related product (features, price, manufacturer name etc.). The customer may click on a purchase button 63 to access a page (not illustrated herein) for purchasing the vehicle-related product. Moreover, the customer may click on an installation reservation button 64 to access a page (not illustrated herein) to reserve the installation work of the vehicle-related product on the customer's vehicle.

A page 65 is displayed when the purchase procedure has been completed. The page 65 includes several fields in which the customer can enter his or her satisfaction degree and comment for the vehicle-related product that he or she has purchased. The customer may enter his or her satisfaction degree, comment and so on in these fields and transmit them to the main agent 2.

Figure 12:
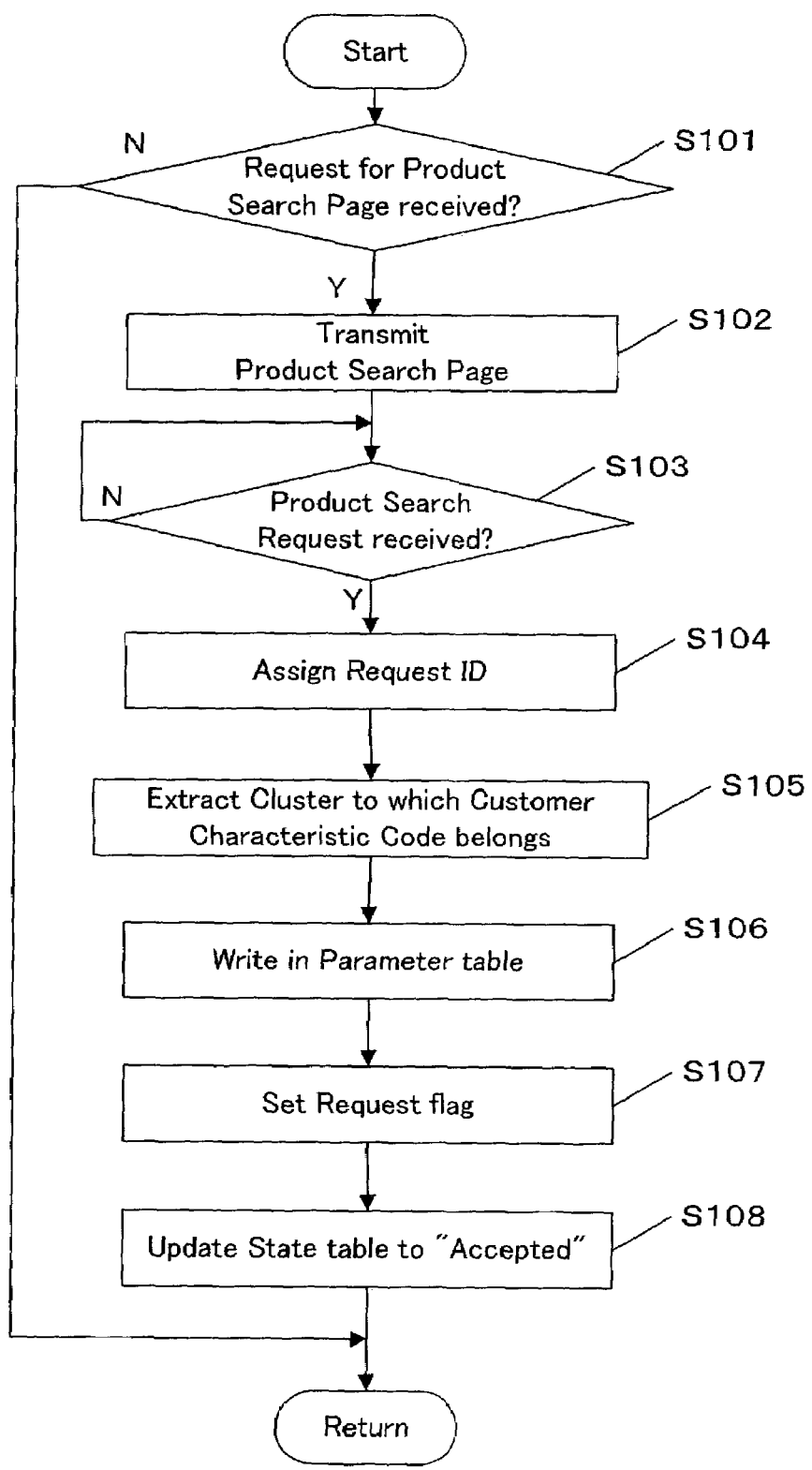
FIG. 12 is a flowchart of a process for receiving a vehicle-related product search request from a customer in accordance with one embodiment of the present invention.

FIG. 12 is a flowchart of a process, performed by the main agent 2, for receiving the vehicle-related product search request from a customer. In step S101, if a request for the vehicle-related product search page is received from the customer terminal 18, the process proceeds to step S102. If no request is received, the process exits the routine. In step S102, the product search page is sent to the customer terminal 18. In step S103, the process waits until the product search request entered on the product search page is received from the customer terminal 18.

If the product search request is received, the process proceeds to step S104, in which a request ID is assigned to the product search request. In step S105, a customer ID is identified from the product search request and then the customer characteristic code for the identified customer is extracted from the customer table 3. The customer characteristic map is searched based on the customer characteristic code to determine a cluster to which the customer characteristic code belongs.

Alternatively, a class to which the customer characteristic code belongs may be stored in the customer table 3 when the cluster analysis of FIG. 4 is performed. In this case, a cluster is determined from the customer ID without referring to the customer characteristic map.

In step S106, the determined cluster, the product search request and the determined cluster are written in the parameter table 5. As described above, the product search request is encoded using the product characteristic code. In step S107, the request flag is set to 1. In step S108, the state table 7 is updated to be "Accepted."

Figure 13:
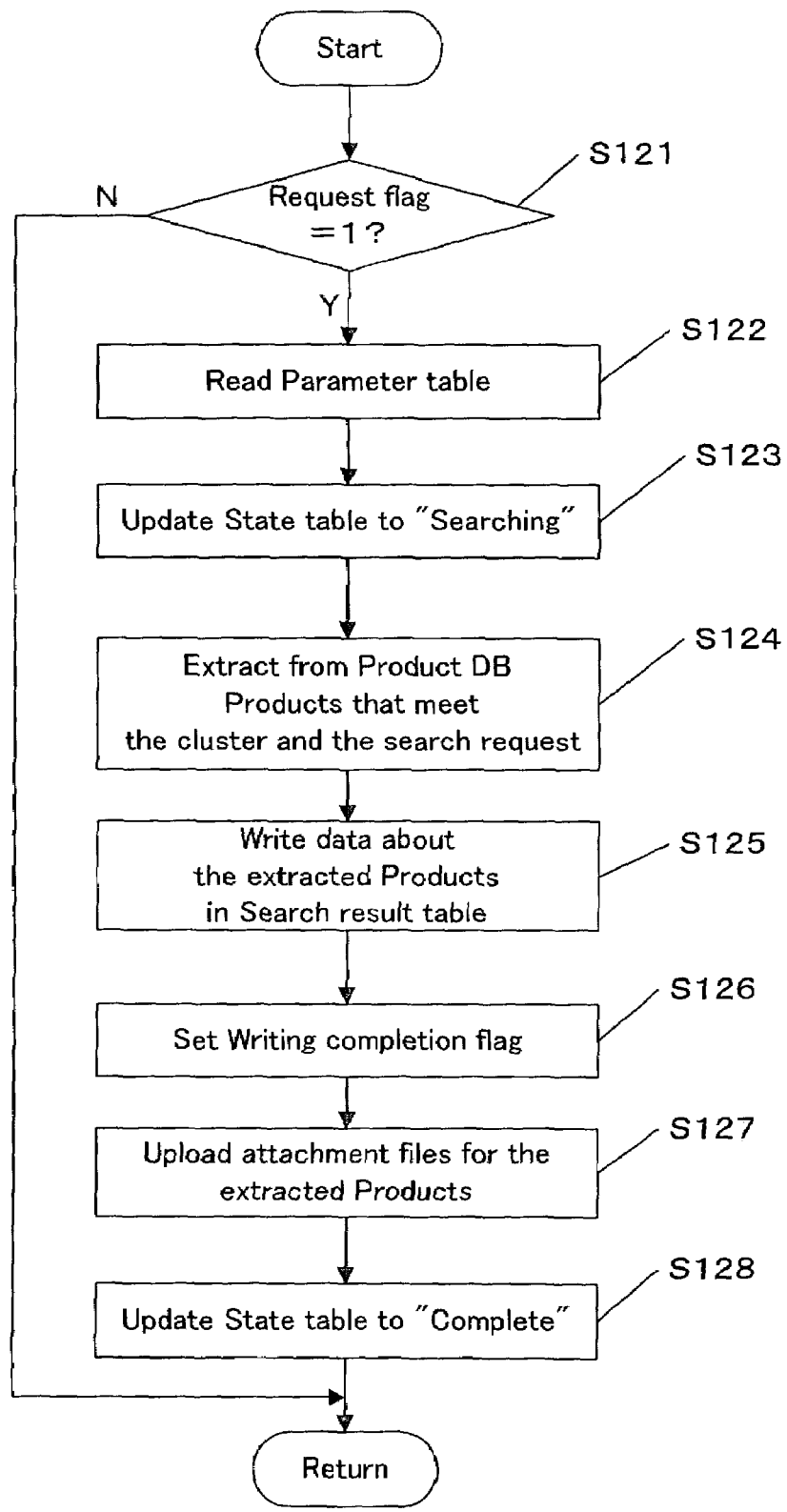
FIG. 13 is a flowchart of a process for searching a vehicle-related product in response to a vehicle-related product search request by a customer in accordance with one embodiment of the present invention.

FIG. 13 is a flowchart of a vehicle-related product search process performed by each of the supplier agents 12 through 14. In step S121, it is determined whether the value of the request flag is 1. If the value of the request flag is not 1, the process exits the routine. If the value of the request flag is 1, the cluster to which the customer characteristic code belongs and the product search request are read out from the parameter table 5 (S122).

In step S123, the state table 7 is updated to be "Searching." In step S124, one or more vehicle-related products that meet the cluster and the product search request are extracted from the vehicle-related product database. In step S125, information about the extracted vehicle-related products, including name, price etc., is written in the search result table 6. In step S126, the writing completion flag in the search result table 6 is set to 1. In step S127, one or more attachment files that contain detailed description about the extracted vehicle-related products and image data of the vehicle-related products are uploaded to the Web server 4. In step S128, the state table 7 is updated to be "Completed."

Figure 14:
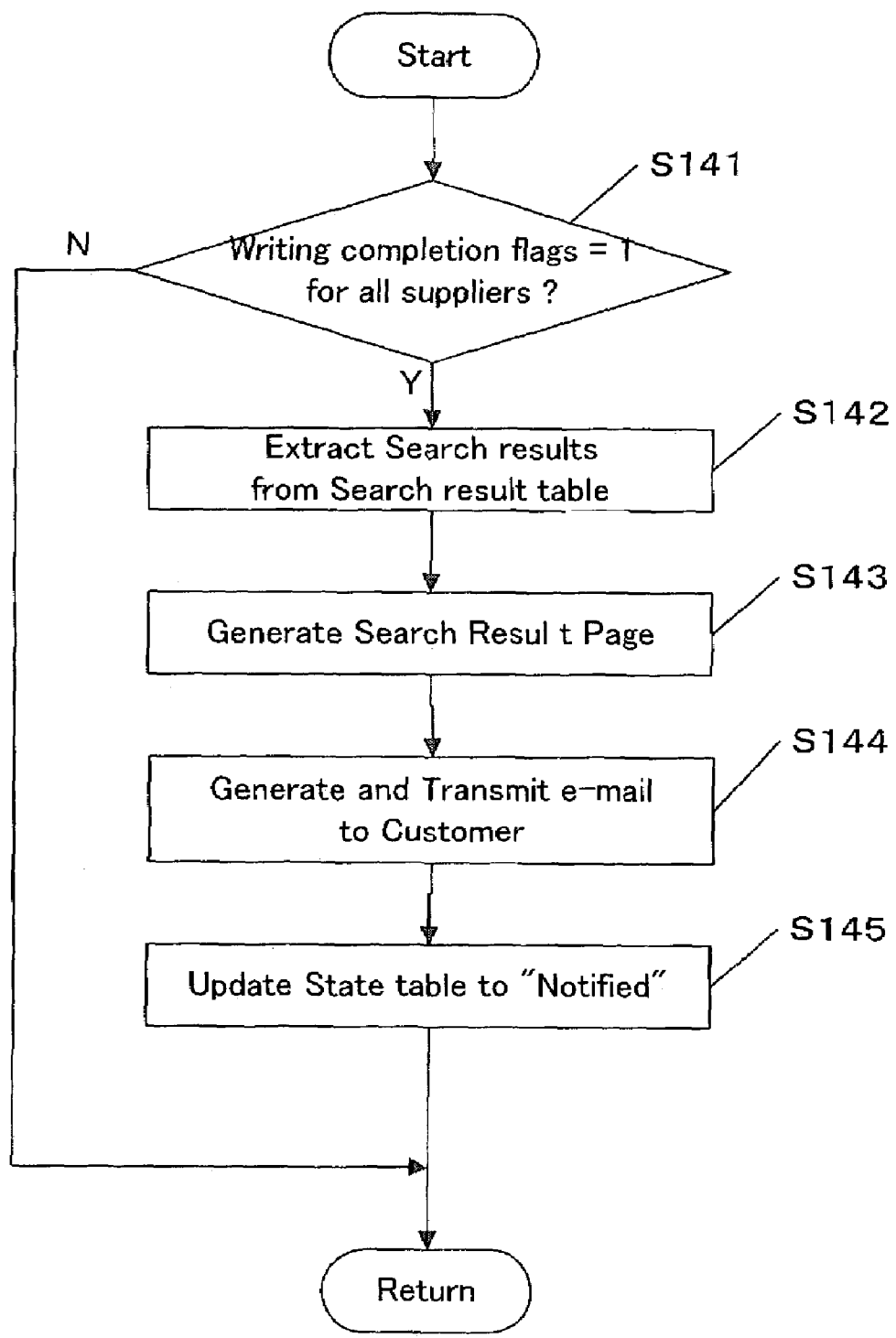
FIG. 14 is a flowchart of a process for editing a search result and notifying a customer of the search result in accordance with one embodiment of the present invention.

FIG. 14 is a flowchart of a process, performed by the main agent 2, for notifying the customer of the search results. In step S141, the values of the writing completion flags of the search result table 6 are examined to determine whether writing operation into the search result table 6 performed by all of the supplier agents is completed. If the writing operation by all of the supplier agents is completed, the process proceeds to step S142, in which the search results that include names, prices, attachment files and so on for the extracted vehicle-related products are read out from the search result table 6. The search results are edited into one search result page (S143).

Alternatively, the search result table is examined after a given time period has elapsed since the product search request was written in the parameter table, so that only search results that have a value of 1 in the writing completion flag are read out.

In step S144, URL of the search result page is described in e-mail, which is transmitted to the customer. In step S145, the state table 7 is updated to be "Notified."

In another embodiment, each of the supplier agents determines a vehicle owned by a customer based on customer information that the agent itself maintains or customer information stored in the customer table. The supplier determines whether a vehicle-related product retrieved based on the customer's search request can be installed on the vehicle of the customer. A result of the determination may be displayed in the search result page through the search result table. Thus, a customer can confirm compatibility between his or her own vehicle and the vehicle-related product through the screen.

Although the present invention has been described with respect to specific embodiments, the present invention is not limited to those embodiments.

What is claimed is:

1. A computer system for providing a list of one or more products that meet characteristics of a customer, comprising:

a first server including a main agent, a customer table encoded on a computer-readable medium being provided in the main agent, the customer table storing customer characteristic codes, each of the characteristic codes representing characteristics of each of customers; and a second server including a supplier agent connected to the main agent through a network, a product database encoded on a computer-readable medium being provided in the supplier agent, the product database storing products provided by a supplier of the supplier agent, wherein each of the products in the product database is assigned a customer characteristic code in accordance with characteristics of the product;

wherein the main agent is programmed to:
identify a customer based on a product search request received from the customer;
extract a customer characteristic code from the customer table based on the identified customer; and
write the product search request and the extracted customer characteristic code in a parameter table;

wherein the supplier agent is programmed to:
read out the product search request and the customer characteristic code from the parameter table;
extract from the product database one or more products that meet the product search request and that are assigned the customer characteristic code; and
write the extracted products in a search result table;

wherein the main agent is further programmed to:
read out the extracted products from the search result table; and
provide the list by editing the extracted products into a search result screen.

2. The computer system according to claim 1, wherein the customer characteristic code for a customer is determined based on an answer of the customer to a questionnaire.

3. The computer system according to claim 1, wherein the customer characteristic code for a customer includes a first value representing the degree of interests that the customer has in vehicles and a second value representing a sense of values that the customer has for vehicles.

4. The computer system according to claim 1, wherein each of the products in the product database is further assigned a product characteristic code that represents characteristics of the product;

wherein the main agent is further programmed to:
encode the product search request from the customer by using the product characteristic code;
write the encoded product search request in the parameter table, wherein the supplier agent is further programmed to:
extract from the product database one or more products that have the product characteristic code included in the encoded product search request written in the parameter table and that are assigned the customer characteristic code of the identified customer.

5. The computer system according to claim 4, wherein the product search request is expressed without specifying a product name and a product type by being encoded by using the product characteristic code.

6. The computer system according to claim 1, wherein there are a plurality of supplier agents; and
wherein the main agent is further programmed to:
provide the list by editing products extracted by the plurality of supplier agents into one search result screen.

7. The computer system according to claim 1, wherein the search result screen is designed to enable the customer to select and purchase a desired product from the extracted products.

8. The computer system according to claim 7, wherein, when the customer selects and purchases the desired product, a display screen in which the customer can enter satisfaction for the product is provided.

9. The computer system according to claim 1, further comprising a state table for storing progress of the product search request.

10. The computer system according to claim 1, wherein the supplier agent is provided in each of suppliers who supply products to a company, the company maintaining the main agent.

* * * * *